United States Patent
Yonehara et al.

(10) Patent No.: US 6,891,578 B2
(45) Date of Patent: May 10, 2005

(54) METHOD OF MANUFACTURING A THIN-FILM SEMICONDUCTOR DEVICE USED FOR A DISPLAY REGION AND PERIPHERAL CIRCUIT REGION

(75) Inventors: Takao Yonehara, Kanagawa (JP); Kiyofumi Sakaguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 151 days.

(21) Appl. No.: 10/059,171

(22) Filed: Jan. 31, 2002

(65) Prior Publication Data
US 2002/0102758 A1 Aug. 1, 2002

(30) Foreign Application Priority Data
Jan. 31, 2001 (JP) .................................... 2001-024172

(51) Int. Cl.[7] .............................................. G02F 1/136
(52) U.S. Cl. ........................................... 349/43; 349/47
(58) Field of Search .............................. 349/43, 46–78

(56) References Cited

U.S. PATENT DOCUMENTS

| | | | |
|---|---|---|---|
| 5,206,749 A | 4/1993 | Zavracky et al. ............. 359/59 |
| 5,256,562 A | 10/1993 | Vu et al. ....................... 437/86 |
| 5,757,456 A * | 5/1998 | Yamazaki et al. ........... 349/151 |
| 5,811,348 A | 9/1998 | Matsushita et al. .......... 438/455 |
| 5,856,229 A | 1/1999 | Sakaguchi et al. ........... 438/406 |
| 5,985,742 A | 11/1999 | Henley et al. ................ 438/515 |
| 6,075,280 A | 6/2000 | Yung et al. .................. 257/620 |
| 6,107,213 A | 8/2000 | Tayanaka et al. ............ 438/762 |
| 6,136,668 A | 10/2000 | Tamaki et al. ............... 438/462 |
| 6,186,384 B1 | 2/2001 | Sawada .......................... 225/2 |
| 6,190,937 B1 | 2/2001 | Nauagawa et al. ............ 438/67 |
| 6,222,513 B1 | 4/2001 | Howard et al. ............... 345/84 |
| 6,258,698 B1 | 7/2001 | Iwasaki et al. ............... 438/455 |
| 6,306,729 B1 | 10/2001 | Sakuguchi et al. .......... 438/458 |
| 6,331,208 B1 | 12/2001 | Nishida et al. ............... 117/89 |
| 6,342,433 B1 | 1/2002 | Ohmi et al. ................. 438/455 |
| 6,382,292 B1 | 5/2002 | Ohmi et al. ................. 156/584 |
| 6,455,398 B1 | 9/2002 | Fonstad, Jr. et al. ........ 438/459 |
| 6,465,329 B1 | 10/2002 | Glenn ......................... 438/462 |
| 6,500,731 B1 | 12/2002 | Nakagawa et al. .......... 438/455 |
| 6,602,761 B2 | 8/2003 | Fukunaga ................... 438/459 |
| 6,627,487 B2 * | 9/2003 | Zhang ........................ 438/166 |
| 6,677,183 B2 | 1/2004 | Sakaguchi et al. .......... 438/113 |
| 6,682,963 B2 * | 1/2004 | Ishikawa .................... 438/149 |
| 6,682,990 B1 | 1/2004 | Iwane et al. ................. 438/458 |
| 2002/0076904 A1 | 6/2002 | Imler ......................... 438/462 |
| 2002/0100941 A1 | 8/2002 | Yonehara et al. ........... 257/359 |

FOREIGN PATENT DOCUMENTS

| | | |
|---|---|---|
| EP | 849 788 | 6/1998 |
| EP | 858 110 | 8/1998 |
| EP | 886 300 | 12/1998 |
| EP | 1 122 794 | 8/2001 |
| JP | 9-312349 | 12/1997 |
| JP | 11-316397 | 11/1999 |

OTHER PUBLICATIONS

Shimoda, T., et al: "Surface Free Technology By Laser Annealing (SUFTLA)" International Electron Devices Meeting 1999. IEDM. Technical Digest. Washington, DC, Dec. 5–8, 1999, New York, NY: IEEE, US, Aug. 1, 1999, p. 289–292, XP000933199 ISBN: 0–7803–5411–7.

* cited by examiner

Primary Examiner—Thanh Nguyen
(74) Attorney, Agent, or Firm—Fitzpatrick, Cella, Harper & Scinto

(57) ABSTRACT

A thin-film semiconductor device used for a display region and peripheral circuit region and a method of manufacturing the same are provided. A method of manufacturing a display device includes the step of preparing a member having, on a separation layer, a semiconductor film having a first region with a switching element and a second region with a peripheral circuit, the step of forming an image display portion on the first region, and the separation step of separating the first and second regions from the member.

11 Claims, 4 Drawing Sheets

110 SEMICONDUCTOR FILM
100 SEPARATION LAYER
130 SEMICONDUCTOR REGION

109 SWITCHING ELEMENT
108 PERIPHERAL ELEMENT 150
151 TRANSPARENT SEALING MATERIAL

118 PROTECTIVE LAYER
115 LIQUID CRYSTAL LAYER
116 TRANSPARENT COVER
113 IMAGE DISPLAY PORTION
117 LIQUID CRYSTAL SEAL
114 PROTECTIVE LAYER

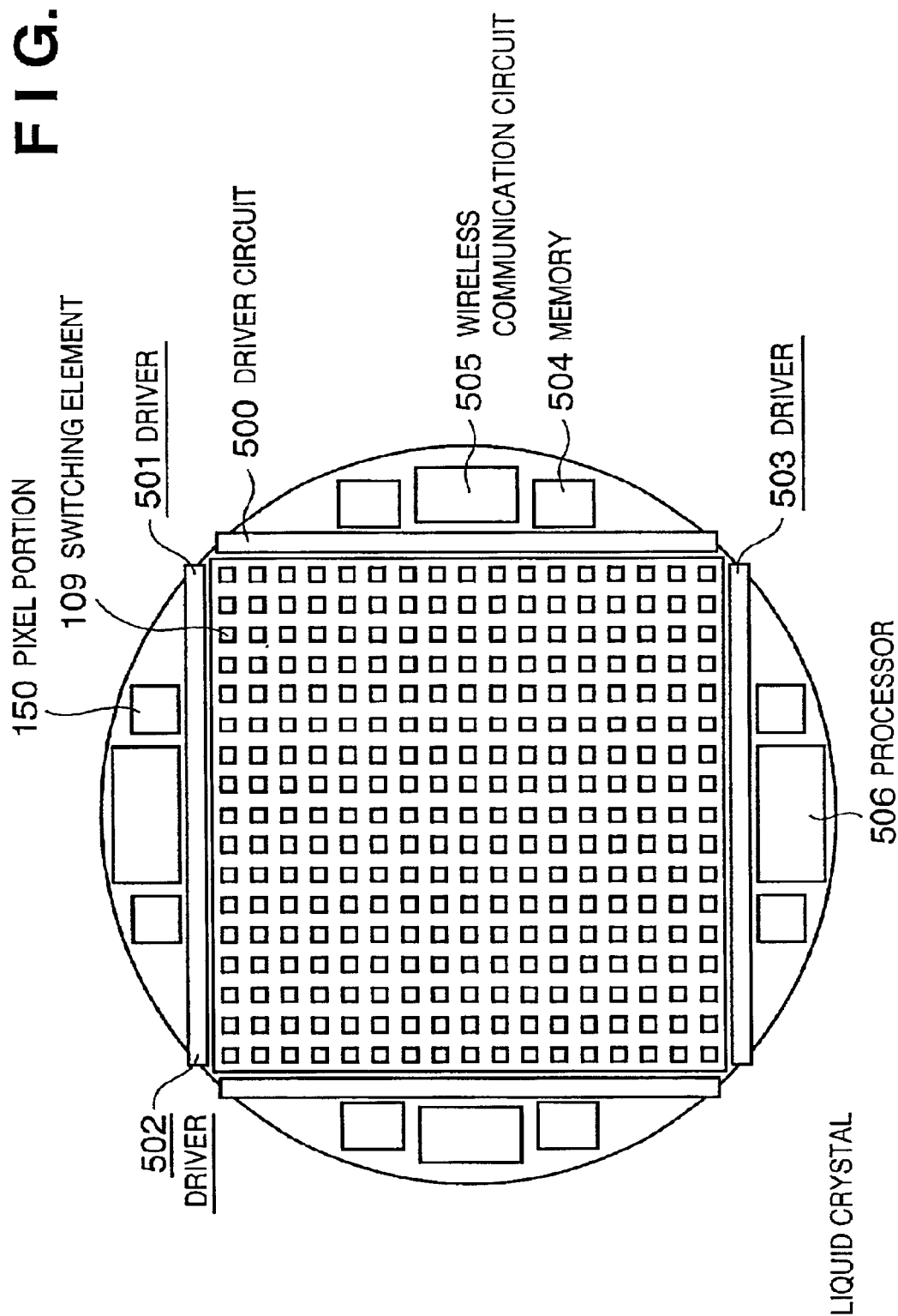

METHOD OF MANUFACTURING A THIN-FILM SEMICONDUCTOR DEVICE USED FOR A DISPLAY REGION AND PERIPHERAL CIRCUIT REGION

FIELD OF THE INVENTION

The present invention relates to a display device and, more particularly, to a liquid crystal display device in which a display portion and peripheral circuit portion are formed on a single semiconductor thin film.

BACKGROUND OF THE INVENTION

To increase the driving capability of a liquid crystal display device, single-crystal silicon tends to be used as a semiconductor for a display region and peripheral region. This is an attempt to form a driving element, switching element, and the like on a single-crystal silicon substrate surface. FIG. 4 shows an example.

Referring to FIG. 4, reference numeral 1 denotes a single-crystal silicon substrate; 6, a LOCOS insulating layer; 7, a light-shielding layer; 8, an insulating layer; 12, a reflecting electrode; 13, a pixel electrode; 14, a liquid crystal layer; 15, a common transparent electrode; 20, a switching element and the like; 21, a peripheral circuit; 111, a display region; 112, a peripheral region; and 51, a sealing material. Details of the switching element and the like are not illustrated. The switching element and the like and the peripheral circuit are formed using the single-crystal silicon substrate as a base to increase the driving capability.

When a single-crystal silicon substrate is used as the active layer of a driving element and the like, the driving capability may degrade due to heat generated from the driving element and the like. In addition, when micropatterning/integrating techniques for semiconductor devices are frequently used to form peripheral circuits, the chip heat density from these circuits may greatly increase.

To solve these problems, a technique is used to grind a semiconductor region 55 from a lower surface 52 side of the substrate using a back grinder to make the semiconductor device thin.

However, since the most part of the substrate is ground, the technique using a back grinder is not preferable for effective use of limited resources. Furthermore, even with this grinding technique, the device can be made as thin as only several hundred $\mu$m. Hence, no sufficient measure against heat generation can be obtained.

SUMMARY OF THE INVENTION

The present invention has been made in consideration of the above problems, and has as its object to provide a thin semiconductor device used for a display region and peripheral circuit region and a method of manufacturing the same.

According to the present invention, there is provided a method of manufacturing a display device, comprising the step of preparing a member having, on a separation layer, a semiconductor film having a first region with a switching element and a second region with a peripheral circuit, the step of forming an image display portion on the first region, and the separation step of separating the first and second regions from the member together with the image display portion.

According to the present invention, there is also provided a display device comprising a semiconductor film laid out on a separation surface and having a first region with a switching element and a second region with a peripheral circuit, and an image display portion laid out on the first region.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a schematic plan view showing a display device according to the present invention.

DETAILED DESCRIPTION OF THE PREFERRED EMBODIMENTS

The first embodiment of the present invention will be described with reference to FIGS. 1A to 1F.

Figure 1A:
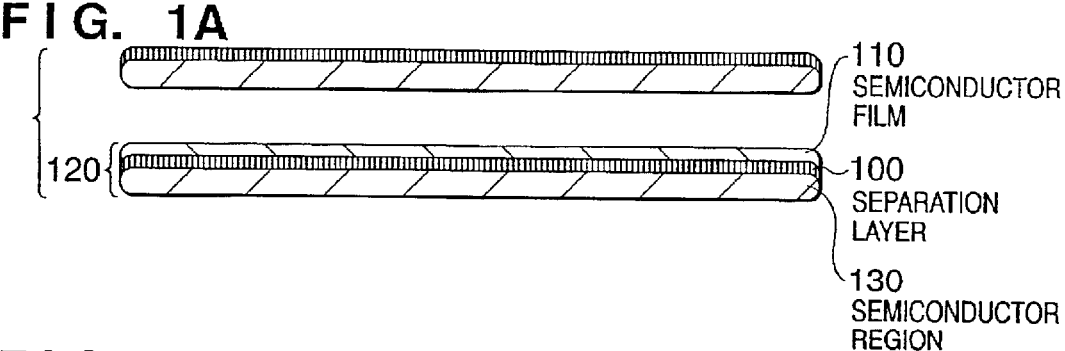
FIGS. 1A to 1F are schematic sectional views showing an embodiment of the present invention.
Figure 1B:
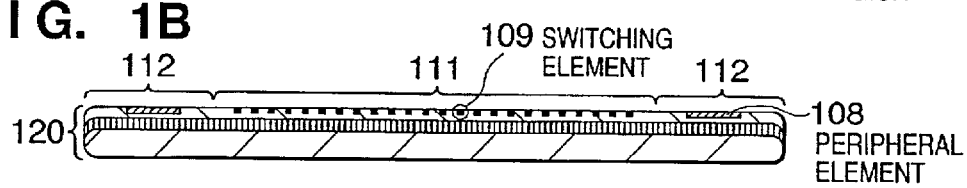

First, as shown in FIG. 1A, a member 120 having a semiconductor film 110 on a semiconductor region 130 via a separation layer 100 is prepared. Switching elements 109 are formed in a display region 111 of the semiconductor film 110. Peripheral circuit elements 108 are formed in a peripheral region 112 (FIG. 1B). As a switching element, for example, a MOS transistor can be used. The peripheral circuit elements can include, e.g., a microprocessor and memory. The peripheral region 112 can include, e.g., a logic circuit, data signal processor, high-frequency circuit, power supply circuit, high breakdown voltage circuit, analog circuit, sound source circuit, oscillation circuit, optical waveguide, micromachine, bioelement, and various sensor circuits.

Figure 1C:
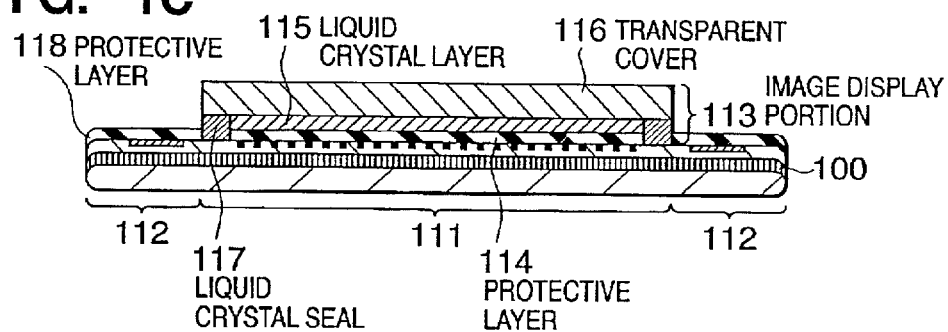
Figure 1D:
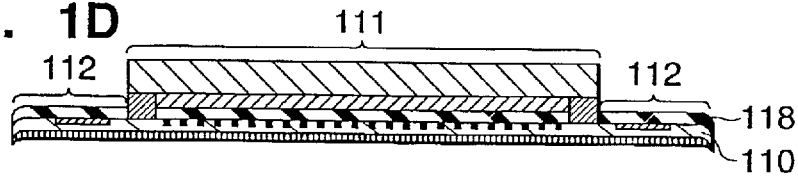

Next, an image display portion 113 is formed on the display region 111 (FIG. 1C). The image display portion 113 includes, e.g., a protective layer 114 such as an insulting film, a liquid crystal layer 115 of TN or the like, a transparent cover 116, and a liquid crystal seal 117. Reference numeral 118 in FIG. 1C denotes a protective layer of $SiO_2$ or the like.

After that, the semiconductor film 110 is separated from the member 120 at the separation layer 100. The separation method will be described later. The separation step may be executed before formation of the image display portion 113, and then, the display portion may be formed.

In this way, the display region 111 and peripheral region 112 formed on the semiconductor film 110 can be thinned. FIG. 3 is a plan view showing a transparent light bulb manufactured by the above method. Referring to FIG. 3, reference numeral 500 to 503 denote driver circuits; 504, a memory; 505, a wireless communication circuit; and 506, a processor. The elements are not limited to these circuits. In this case, a liquid crystal display device is used as a display device. However, instead of a liquid crystal display device, a DMD, organic EL, paper-like display (described in, e.g., Japanese Patent Laid-Open No. 11-316397), or plasma display may be used.

When the separation layer has a porous structure, the separation layer remaining on the semiconductor film 110 may be left. In this case, since the porous structure has a high resistance, any leakage current between elements can be suppressed. In addition, since the separation layer serves as a gettering site, the resistance against metal contamination during the processes increases. The separation layer 100 remaining on the semiconductor film 110 may be removed by etching or polishing, as needed.

Figure 1E:
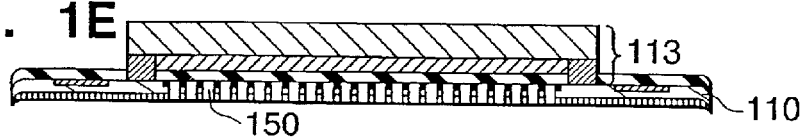
Figure 1F:
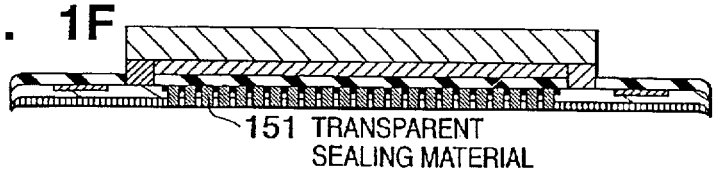

If the light bulb manufactured in the above-described steps is to be used as a reflection-type display device, no particular processes are required any more. However, if the light bulb is to be used as a transmission-type display device, the following step is still necessary. The semiconductor film 110 at each pixel portion is removed (hollowed out) from the separation layer 100 side by etching or the like, as shown in FIG. 1E, to pass light. Each hollowed portion 150 can be sealed by a transparent sealing material 151 such as a transparent resin or glass material, as needed (FIG. 1F).

After separation (or after removal of the remaining separation layer in some cases), the device can be bonded to a glass substrate or silicon substrate or can be directly bonded to a heat sink.

The second embodiment of the present invention will be described next with reference to FIGS. 2A to 2F.

The second embodiment is different from the above-described embodiment in that each pixel portion 150 of a semiconductor film 110 in a display region 111 is hollowed out before formation of an image display portion 113.

Figure 2A:
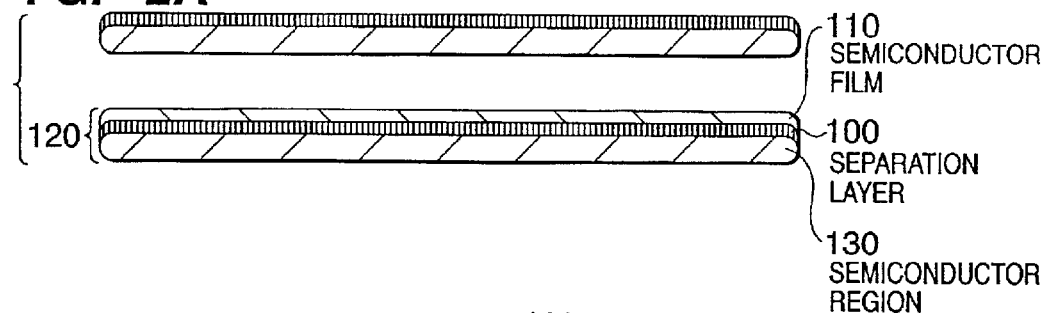
FIGS. 2A to 2F are schematic sectional views showing another embodiment of the present invention.
Figure 2B:
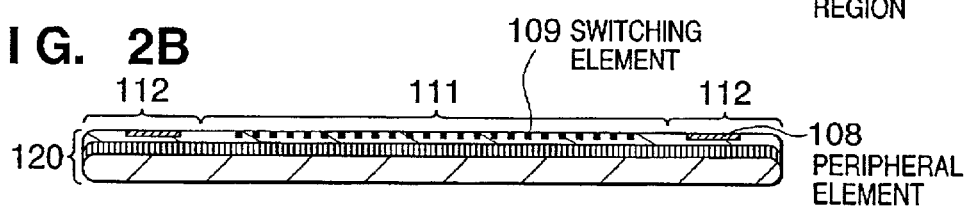
Figure 2C:
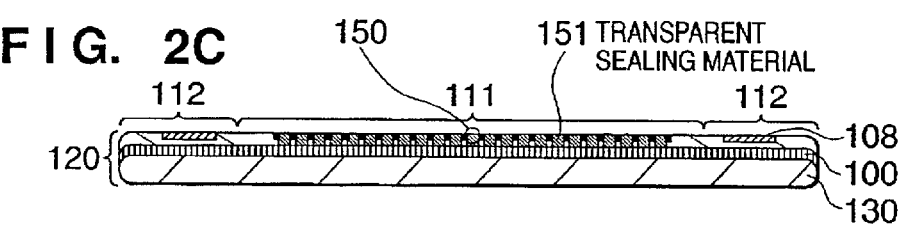
Figure 2D:
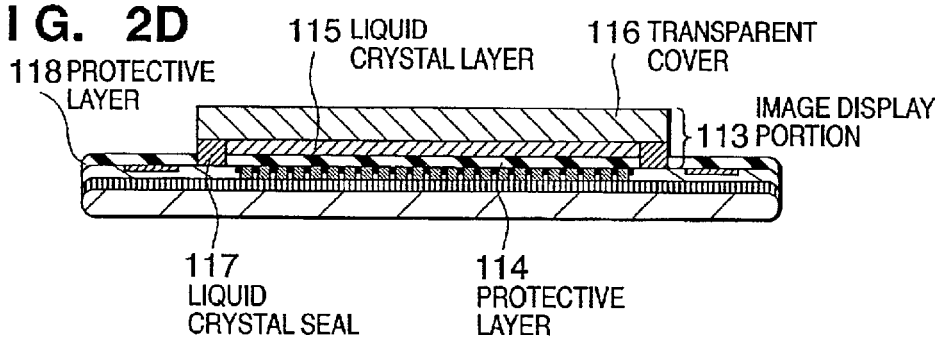

As shown in FIG. 2A, a member 120 having the semiconductor film 110 on a semiconductor region 130 via a separation layer 100 is prepared. As shown in FIG. 2B, switching elements 109 are formed in the display region 111, and peripheral elements 108 are formed in a peripheral region 112.

After that, each pixel portion 150 in the display region 111 is removed (hollowed out) by etching or the like. The hollowed portion is filled with a transparent sealing material 151. Next, the image display portion 113 is formed in the display region 111. Details are the same as in the above-described first embodiment.

Figure 2E:
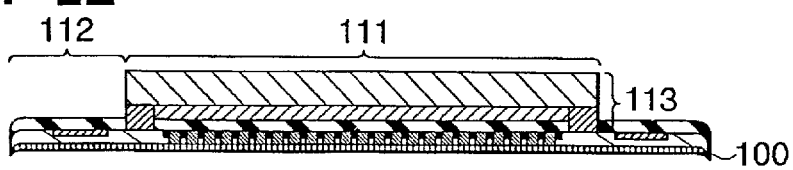
Figure 2F:
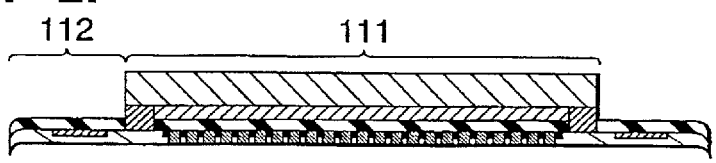
Figure 4:
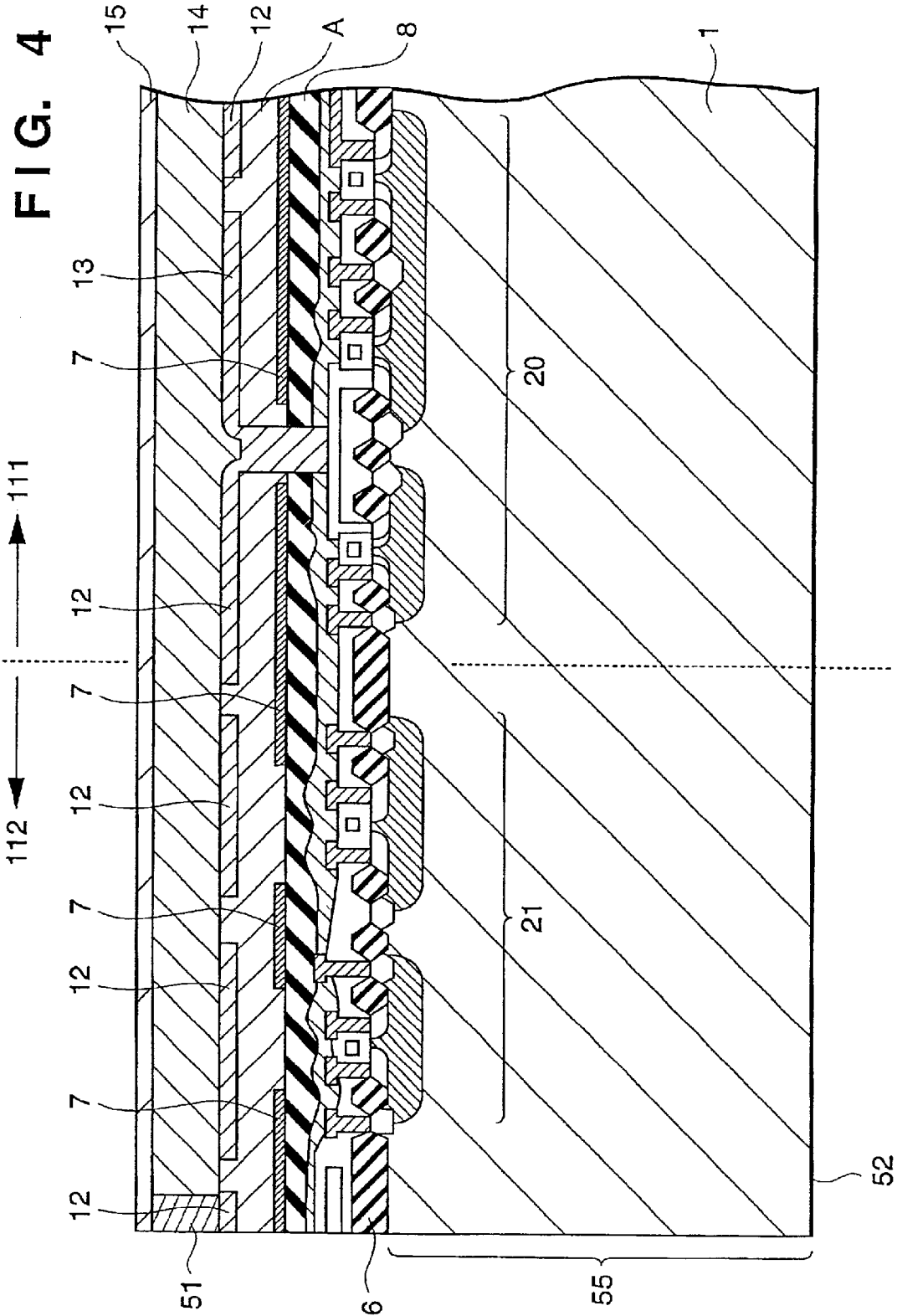
FIG. 4 is a schematic sectional view for explaining a prior art.

Next, as shown in FIG. 2E, the semiconductor film 110 is separated at the separation layer 100. In this way, the display region 111 and peripheral region 112 formed on the semiconductor film 110 can be thinned. As shown in FIG. 2F, the remaining separation layer 100 may be removed.

The separation layer, semiconductor film, member, and separation method in the above-described first and second embodiments will be described below.

More specifically, the separation layer 100 is a porous silicon layer formed by anodizing the surface of a single-crystal silicon wafer or an ion-implanted layer formed by implanting hydrogen ions, helium ions, nitrogen ions, or rare gas ions to a desired depth of a single-crystal silicon wafer.

In the former case, to form the member 120, a non-porous thin film such as a single-crystal silicon film is grown on the porous silicon layer by CVD or the like. The separation layer 100 may be formed from a plurality of layers having different porosities. For example, a two-layered structure including a high-porosity layer and low-porosity layer from the semiconductor region 130 side may be formed. Alternatively, a three-layered structure including a low-porosity layer, high-porosity layer, and low-porosity layer from the semiconductor region 130 side may be formed. The porosity of a high-porosity layer can be 10% to 90%. The porosity of a low-porosity layer can be 0% to 70%. To form a plurality of layers having different porosities, the current density in anodizing is changed, or the type or concentration of an anodizing solution is changed.

When a porous layer is formed by anodizing, a protective film forming process of forming a protective film such as a nitride film or oxide film on the inner walls of pores in the porous layer or an annealing process in an atmosphere containing hydrogen is preferably performed before growing the semiconductor film 110 on the porous layer. It is also preferable to execute the annealing process after the protective film forming process.

When the semiconductor film 110 is to be grown by CVD, the semiconductor film 110 is preferably slowly grown at 20 nm/min or less to a predetermined thickness (e.g., 10 nm).

As the semiconductor film 110, a non-porous single-crystal silicon thin film or a compound semiconductor film such as a GaAs, InP, or GaN film can be used. When the semiconductor film is made of single-crystal silicon, $SiH_2Cl_2$, $SiHCl_3$, $SiCl_4$, $SiH_4$, or HCl gas may be added as a source gas. The forming method is not limited to CVD, and MBE or sputtering can also be used.

After the porous layer is subjected to first annealing in an atmosphere containing hydrogen, second annealing is preferably executed at a temperature higher than that for the first annealing. The first annealing temperature can be 800° C. to 1,000° C., and the second annealing temperature can be 900° C. to melting point. With this process, pores on the surface of the porous layer can be sufficiently sealed. For example, the first annealing may be executed at 950° C., and the second annealing may be executed at 1,100° C.

In the latter case wherein a separation layer is formed by ion implantation, it is preferable to implant ions to a desired predetermined depth after the peripheral elements 108 and switching elements 109 are formed on the semiconductor film 110. To form elements, normally, a process temperature of about 800° C. is necessary. This is because a separation layer in which hydrogen ions or the like are implanted causes coagulation of microcavities (microbubbles) and separation or diffusion of hydrogen ions or the like at 400° C. to 600° C. When measures against such phenomenon are taken, the peripheral elements and switching elements may be formed after ion implantation.

As the member 120, not only a single-crystal silicon wafer prepared by the CZ method, MCZ method, or FZ method but also a wafer having a substrate surface annealed in hydrogen or epitaxial silicon wafer can also be used. Not only silicon but also a compound semiconductor substrate such as a GaAs substrate or InP substrate can be used.

As a separation method, a fluid such as a liquid or gas is injected near the side surface of the separation layer, or a high pressure by a fluid is applied under a static pressure. For separation under a static pressure, for example, the following pressure application mechanism is necessary. That is, a closed space forming member for forming a closed space by surrounding at least part of the peripheral portion of the member, and a pressure application mechanism capable of applying a pressure higher than that of the external space into the closed space are required. As a liquid, for example, water, an etchant, or an alcohol is preferable. As a gas, for example, air, nitrogen gas, or argon gas is preferable. An ultrasonic wave may be applied to the fluid.

Especially when the separation layer is formed by implanting hydrogen ions or the like, and the resultant structure is annealed at about 400° C. to 600° C., a microcavity layer formed by ion implantation coagulates. The member may be separated using this phenomenon.

Alternatively, a portion may be separated by an external force such as a tensile force, shearing force, or compression force. Also, the member may be separated by heating the separation layer by a laser or the like.

Examples of the present invention will be described below.

EXAMPLE 1

A p- or n-type first single-crystal Si substrate having a diameter of 300 mm and a resistivity of 0.01 Ω·cm was anodized in an HF solution. The anodizing conditions were Current density: 7 (mA·cm$^{-2}$)

Anodizing solution: HF:H$_2$O:C$_2$H$_5$OH=1:1:1

Time: 11 (min)

Thickness of porous Si layer: 12 (μm)

The porosity of the porous Si layer was adjusted such that a high-quality epitaxial Si layer could be formed on the porous Si layer and the porous Si layer could be used as a separation layer. More specifically, the porosity was 20%. The thickness of the porous Si layer is not limited to the above thickness and may be several hundred μm to 0.1 μm. The resistivity of the substrate is not limited to the particular value. The substrate typically has a resistivity ranging from 0.001 to 50 Ω·cm, preferably from 0.005 to 1 Ω·cm, and more preferably from 0.005 to 0.1 Ω·cm.

This single-crystal Si substrate was oxidized in an oxygen atmosphere at 400° C. for 1 hr. With this oxidation, the inner walls of pores in the porous Si layer were covered with a thermal oxide film. The surface of the porous Si layer was processed in hydrofluoric acid to remove only the oxide film on the surface of the porous Si layer while leaving the oxide film on the inner walls of the pores. After that, a 0.15-μm thick single-crystal Si layer was epitaxially grown on the porous Si layer by CVD (Chemical Vapor Deposition). The growth conditions were Source gas: SiH$_2$Cl$_2$/H$_2$ Gas flow rate: 0.5/180 l/min Gas pressure: 80 Torr Temperature: 950° C.

Growth rate: 0.3 μm/min

The single-crystal Si layer may be grown on the porous Si layer to have a thickness ranging from several nm to several hundred μm in accordance with applications or devices to be manufactured.

Before the epitaxial growth, annealing was executed in an atmosphere containing hydrogen. The purpose was to seal surface pores. In addition to this annealing, small Si atoms may be added by a source gas or the like to compensate for surface pore sealing.

A resultant substrate can be handled as a wafer that is identical to a normal epitaxial wafer. Only a different point is that the porous layer is formed under the epitaxial layer.

On this epitaxial layer, switching elements for a 11-inch active matrix LCD were formed at the center of the wafer, and peripheral shift registers, driving circuits, a microprocessor, logic IC, and memory were formed at the peripheral portion. With the same processes as in normal manufacturing, an LSI having performance identical to a conventional LSI could be formed.

A liquid crystal display portion is formed by the following processes.

1) A semiconductor layer is formed (e.g., 0.15 μm). This layer is already formed as the epitaxial layer.
2) A gate insulating film is formed (e.g., 0.1 μm).
3) The semiconductor layer and gate insulating layer are patterned (mesa etching, LOCOS, or trench).
4) A gate electrode is formed (a gate electrode having a thickness of, e.g., 0.5 μm is formed from low-resistance polysilicon). This process also includes doping of boron or phosphorus.
5) The gate electrode is patterned.
6) Ions are implanted into the source and drain.
7) An insulating layer is formed (e.g., 0.7 μm).
8) Contact holes for an interconnection and drain electrode are formed.
9) An Al interconnection is formed and patterned (e.g., 0.6 μm).
10) A dielectric interlayer is formed (e.g., 0.6 μm).
11) Contact holes are formed (substrate-side pixel electrodes).
12) Pixel electrodes such as ITO are formed.
13) An alignment film is formed.
14) A transparent counterelectrode such as ITO is formed on the entire surface of a transparent glass substrate (countersubstrate).
15) A TN liquid crystal is injected.

Thus, active matrix liquid crystal display cells are completed. After formation of the epitaxial layer and before formation of the device, it is also preferable to anneal the epitaxial layer in a hydrogen atmosphere.

In 3) semiconductor layer patterning, the semiconductor layer (epitaxial layer in the present invention) at each pixel portion is completely removed. With this process, after the member is separated at the separation layer and the remaining porous Si layer is removed, sufficient light can pass through each pixel portion.

The Si layer at each pixel portion may be left. In that case, after the member is separated at the porous layer and the remaining porous layer is removed, the Si layer at each pixel portion may be hollowed out from the lower side to pass light (corresponding to the above-described first embodiment). For a reflection-type device, this process can be omitted.

The remaining porous layer may be left. A remaining Si region of the porous Si layer is depleted and has a high resistance. With this structure, high-speed operation and low power consumption of a device can be realized as if an SOI were used.

When a trench is used for element isolation, the area of the peripheral circuit element portion or the switching elements can be reduced. When a trench or LOCOS reaches the porous Si layer, insulation between elements as in SOI+ element isolation can be achieved as well as the high resistance of the porous Si layer.

Next, the member was separated at the porous Si layer functioning as a separation layer. For separation, the pressure of a fluid was used. As a fluid, for example, a gas, a liquid, or a gas or liquid containing solid granules or powder can be used. In Example 1, water jet (to be referred to as "WJ" hereinafter) was used. Alternatively, air jet, nitrogen gas jet or another gas jet, liquid jet except water, liquid jet containing ice or plastic pieces or abrasives, or a static pressure thereof may be applied. As a characteristic feature of a fluid, it can enter a very small gap to increase the internal pressure and also distribute the external pressure. As another characteristic feature, since no excessive pressure is partially applied, a portion that is most readily separated can be selectively separated. This is an optimum means for separating the entire thin layer on which semiconductor devices have already been formed, as in the present invention.

In separation, the entire surface of the transparent glass substrate supports the upper surface side of the first substrate. In place of the glass substrate, a flexible sheet or plastic substrate may be used.

A fluid is applied to a portion near the edge of the first substrate supported by the entire surface of the transparent glass substrate to separate the entire porous Si layer.

The porous Si layer remaining on the device layer side may be removed or not. When the display device is used as a transmission-type display device, at least the porous Si layer remaining on the lower surface of the pixel portions is removed. If the epitaxial layer is not removed from the upper surface side, the epitaxial layer is also removed at this time. After the epitaxial layer is removed, a transparent resin or fluidized glass material may be applied.

When a heat sink or the like is bonded to a portion other than the display region, the heat dissipation properties can be improved.

Since a single-crystal Si layer can be used for the liquid crystal display portion, a highly precise liquid crystal display device capable of high-speed switching can be formed even by micropatterning.

Since both the display region and peripheral circuit region can be thinned, a flexible film-like display device can be manufactured. When peripheral devices are also integrally formed to make a device group necessary for a computer around the display device, a display-integrated computer can also be manufactured.

The substrate-side structure that remained after separation could be re-used in the same process after removal of the remaining porous layer, and if necessary, removal of a layer formed in the device process and remaining at the edge or the like, and if it is also necessary, surface re-polishing were executed. The substrate may also be used for another purpose. For example, the substrate can be used as a dummy wafer.

Even when the process of using the remaining substrate to manufacture a display device was repeated, the device or liquid crystal display portion did not degrade due to repetition of the process because the layer on which the device was to be formed was newly epitaxially grown for every repetition.

EXAMPLE 2

In Example 1, a single porous layer was used. In Example 2, two porous layers having different porosities were formed.

First, the surface of a single-crystal silicon substrate was anodized under the following conditions.

Current density: 8 (mA·cm$^{-2}$)
Anodizing solution: HF:H$_2$O:C$_2$H$_5$OH=1:1:1
Time: 5 (min)
Thickness of porous Si layer: 6 ($\mu$m)

Then, anodizing was executed under the following conditions.

Current density: 33 (mA·cm$^{-2}$)
Anodizing solution: HF:H$_2$O:C$_2$H$_5$OH=1:1:1
Time: 80 (sec)
Thickness of porous Si layer: 3 ($\mu$m)

With these processes, a high-porosity layer having a porosity of 45% and a low-porosity layer having a porosity of 20% were formed from the single-crystal silicon substrate side. After that, a display device was manufactured in accordance with the same procedure as in Example 1.

The thicknesses of the two porous layers need not always be 6 $\mu$m /3 $\mu$m. The thicknesses can be changed by changing the anodizing conditions.

The anodizing solution need not always be HF:H$_2$O:C$_2$H$_5$OH=1:1:1. Instead of ethanol, another alcohol such as IPA (isopropyl alcohol) may be used. An alcohol serving as a surfactant aims at preventing reactive bubbles from sticking to a wafer surface. Hence, a surfactant other than an alcohol may be used. Alternatively, surface sticking bubbles may be removed by an ultrasonic wave without adding any surfactant.

EXAMPLE 3

A p-type single-crystal Si substrate having a resistivity of 14 $\Omega$·cm was prepared. The plane orientation was <100>. On the surface of the single-crystal Si substrate, TFTs were formed in the display region as switching elements, and driving circuits, memory, and microprocessor were formed as peripheral circuits.

After that, hydrogen ions were implanted from the circuit formation layer side to a predetermined depth (in Example 3, a depth of 10 $\mu$m from the surface side), thereby forming an ion-implanted layer. The dose was several $10^{16}$ to $10^{17}$ /cm$^2$. Before implantation, a protective film may be formed on the uppermost surface.

Next, an image display portion was formed in accordance with the same procedure as in Example 1. After that, water was injected to the side surface of the ion-implanted layer as a fluid to execute separation. Alternatively, annealing at 400° C. to 600° C. may be executed for separation.

To manufacture a display device, a commercially available 6-, 8-, or 12-inch single-crystal silicon wafer can be used. Instead, the peripheral portion of a circular wafer may be removed to form a rectangular wafer, and then, the display region and peripheral region may be formed.

According to the present invention, a thin-film semiconductor device having a display region and peripheral circuit region can be manufactured. In addition, when a display region and peripheral circuit region are formed on a single wafer, a compact and thin display device can be manufactured.

As many apparently widely different embodiments of the present invention can be made without departing from the spirit and scope thereof, it is to be understood that the invention is not limited to the specific embodiments thereof except as defined in the appended claims.

What is claimed is:

1. A method of manufacturing a display device, comprising:
   (i) a step of preparing a member by performing the steps of:
      (a) forming a porous layer as a separation layer on a surface of a semiconductor substrate,
      (b) forming a semiconductor film on a surface of the separation layer, and then
      (c) forming a first region with a switching element and a second region with a peripheral circuit in the semiconductor film;
   (ii) a step of forming an image display portion on the first region; and
   (iii) a separation step of separating the first and second regions from the member together with the image display portion.

2. The method according to claim 1, wherein the semiconductor film is formed on a surface of the porous layer after forming a protective film on inner walls of pores in the porous layer.

3. The method according to claim 1, wherein the semiconductor substrate is a single-crystal silicon substrate or a compound semiconductor substrate.

4. The method according to claim 1, wherein the separation step is executed by injecting a fluid formed from a liquid or gas to or near a side surface of the separation layer.

5. The method according to claim 1, wherein the separation step is executed under a static pressure.

6. The method according to claim 1, wherein the member is formed again using a remaining member which remains after the first and second regions are separated from the member.

7. A method of manufacturing a display device, comprising:
  (i) a step of preparing a member by performing the steps of:
    (a) forming a first region with a switching element and a second region with a peripheral circuit in a surface of a semiconductor substrate, and then
    (b) forming a porous separation layer in the semiconductor substrate by implanting ions in the semiconductor substrate through the surface of the semiconductor substrate;
  (ii) a step of forming an image display portion on the first region; and
  (iii) a separation step of separating the first and second regions from the member together with the image display portion.

8. The method according to claim 7 wherein the semiconductor substrate is a single-crystal silicon substrate or a compound semiconductor substrate.

9. The method according to claim 7, wherein the separation step is executed by injecting a fluid formed from a liquid or gas to or near a side surface of the separation layer.

10. The method according to claim 7, wherein the separation step is executed under a static pressure.

11. The method according to claim 7, wherein the member is formed again using a remaining member which remains after the first and second regions are separated from the member.

* * * * *